Sept. 26, 1933.   C. E. LITTLE   1,928,022
EGGBEATER
Filed Aug. 6, 1931
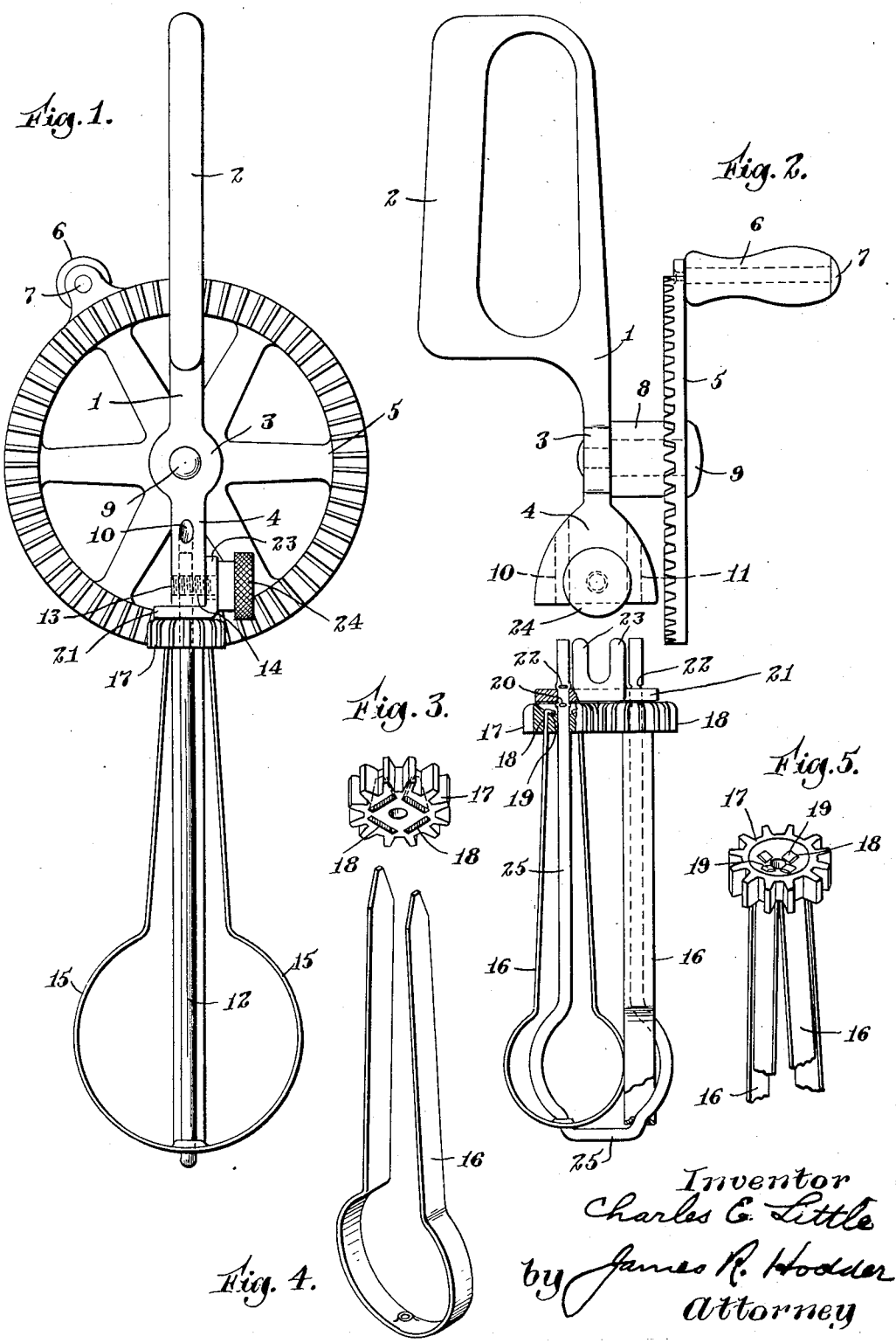
Inventor
Charles E. Little
by James R. Hodder
Attorney Patented Sept. 26, 1933

1,928,022

UNITED STATES PATENT OFFICE 1,928,022

EGGBEATER

Charles E. Little, Melrose, Mass.

Application August 6, 1931. Serial No. 555,402

1 Claim. (Cl. 259—131)

My present invention relates to egg beaters, and more particularly to an improved egg beater of the type operated by hand or power, and the improved process of making the same.

Heretofore, it has been customary in beaters of this kind to arrange the handle and beater portions so that the finished product is one complete unit. It is essential in most households to keep on hand several egg beaters having different sized and shaped floats, therefore necessitating the purchase of as many complete articles. Furthermore, because of the economy of manufacture and cheapness of such articles, they were usually made of extremely flimsy construction, and if one portion became bent or distorted, the usefulness of the entire article was destroyed. This incurs added expense, and it is a main object of my invention, therefore, to obviate such difficulties and I have devised my egg beater comprising a substantially indestructible handle portion adapted to receive interchangeable types or shapes of removable float or beater portions.

These former beaters have also been of very fragile construction, especially where the float is secured to the pinion carrying and turning it. The usual arrangement in such devices has been to fold over the ends of the float or floats onto the pinion and secure them by means of an eyelet. From continued use of such devices the pinion becomes loosened, with the result that the float will slip, thereby rendering the whole device inoperative.

A further object of my invention, therefore, is to provide an interlocking float and pinion structure. Preferably, I provide a pinion fitted with four suitable recesses preferably tapered and extending through to the opposite face of the pinion into which the correspondingly tapered end of the floats dovetail and are clinched over on the other side, thus effecting a rigid, easily made joint which cannot become loosened, and will be practically indestructible.

A further object of my invention, is to provide a new and more convenient handle for my beater. In present day beaters the handles are positioned directly above the gear wheel, whereas I find it much more suitable to work my device with a handle placed on the side.

A most important advantage of my present invention consists in the detachability of the beater portion permitting separate cleaning and washing without damage or injury to the handle and main gear structure. As the beater portion is the only part which requires cleaning, my invention of a separable handle and beater portion greatly facilitates the washing and cleaning action.

Furthermore, as the handle and a plurality of beater portions are interchangeable, one beater may be used, instantly detached, and another and clean beater applied to the handle and operated without cleaning.

A further important feature of my device resides in my improved process of assembling the same. As far as I am informed, this process is distinctly novel, hence I wish to claim the same hereinafter broadly.

Referring to the drawing illustrating a preferred embodiment of my invention,

Fig. 1 is a front elevational view of my improved egg beater comprising a beater portion, having a single float;

Fig. 2 is a side elevational view, showing a different type of beater portion in position for assembling, with part broken away to illustrate the locking arrangement between handle and float unit;

Fig. 3 is a perspective view of a pinion detached from the beater;

Fig. 4 is a perspective view of a float in detached relation to the beater, and

Fig. 5 is a fragmentary perspective view showing a pinion secured to two floats.

In the drawing, 1 designates my improved handle portion positioned at one side of the device and which may be cast out of any suitable metal or alloy. My improved handle structure comprises a gripping portion 2, an enlarged portion 3, and a holding member 4. A gear wheel 5 having a handle 6 attached thereto by a rivet or bolt 7 is fitted with an inturned hub 8, especially constructed of large diameter and length to form a strong bearing with the portion 3 of the handle, said portion 3 and said hub 8 both fitted with appropriate holes to receive the shouldered pivot bolt 9.

Said holding member 4 is provided adjacent its ends with two longitudinally extending holes 10 and 11 of appropriate diameter to frictionally receive the end of the arms of stationary round wire U-shaped axes 12 and 25, and is also provided with a laterally extending threaded hole 13, in which fits the correspondingly threaded locking screw 14 carrying a knurled hub portion 24. Loosely mounted near the bottom of each arm of said axes 12 are the beating portions or floats 15, 15, having tapered ends fitting into correspondingly tapered recesses 18, 18, in the pinions 17, 17, said tapered ends extending through the recesses in the pinions, these being clinched on the top of said pinions 17, 17, as shown in Fig. 5 at 19.

In Fig. 2, I show two floats 16, 16, of different size than said floats 15 in Fig. 1, also pivoting on another type of axis, shown generally by 25. I may utilize any type, size, or style of beater portion in association with my handle portion as long as the two arms of the wire axis are of suitable diameter to frictionally engage the openings in the holding member.

The pinions 17, 17 are likewise centrally constructed with holes to receive the arms of the axes 12 and 25, said arms being formed parallelly near the top so that the pinions 17, 17 will intermesh and, in turn, allow the floats 15 and 16 to rotate on the axes 12 or 25 and thereby effect the beating action. Each arm of said axes 12 and 25 slightly above the top of the pinions 17, 17 is pinched, as shown at 20, to form a rest for the washer 21, which slides over the arms of the axes 12 and 25 through suitable openings in said washer and then is secured by similar pinches 22, 22 on said arms of the axes 12, and 25 directly above the top surface of the washer 21.

Adjacent said washer 21 and extending upwardly therefrom is a bracket 23, slotted to engage the shank of the set screw 14, and forming therewith and quickly attachable and detachable, as well as an exceedingly sturdy construction. While thus positioned, one pinion 17 meshes with the gear 5, and rotation of the gear 5 by the handle turns both beaters.

It will thus be seen that I have devised a new and improved egg beater construction which will not only embody a saving to the average user, but will also prove much more convenient, more durable, and more effective. I contemplate the sale of a plurality of beater portions with each handle portion thereby constituting definite sets to fit into any size cup or bowl in which the beating operation may be performed.

In carrying out my novel process of making my device, I take a plurality of floats and a pair of intermeshing pinions, and lock them together by passing the tapered ends of the floats through similarly tapered grooves in the pinions, and by then clinching over the portion of said end projecting beyond the opposite surface of the pinions. I now fit one of such combinations over each arm of a wire U-shaped axis, suitable holes being provided in both floats and pinions for this purpose, and substantially above the pinions I deform each arm of the axis, preferably by pinching, to provide a rest or seat for an angle iron washer which I now mount, by means of suitable holes, on both arms of said axis. Above the washer to hold it securely in position, I deform the axis arms again, this latter pinching or the like leaving a substantial length of the axis arms free to engage a corresponding holding member in my handle portion, which I form out of any suitable metal or alloy.

I claim:

An egg beater comprising a handle portion and beater portion separable therefrom and adapted for interlocking therewith on a three-point bearing, said handle portion having a hand-holding member, a gear wheel pivotally connected therewith and a beater holding portion integral with the handle portion, said beater holding portion being formed with two longitudinally extending parallel sleeves and a tapped recess at right angles thereto and spaced therefrom, a locking screw adapted to be threaded into said tapped recess, said beater portion having a pair of extending rods to fit in said parallel sleeves, and a U-shaped washer adapted for engagement by the threaded locking screw to provide the three-point bearing between the handle and beater portions, each beater portion including a pinion with slots therethrough, a float with arms extending through said slots and clinched thereon, the float and a pinion being mounted to rotate on a part of the rod extending through the beater portion and into said sleeves.

CHARLES E. LITTLE.